(12) United States Patent
Malinasky, Jr.

(10) Patent No.: US 8,714,182 B2
(45) Date of Patent: May 6, 2014

(54) VALVE FOR IN-FLOOR POOL CLEANING SYSTEM

(75) Inventor: Paul Gerald Malinasky, Jr., Scottsdale, AZ (US)

(73) Assignee: Blue Square Manufacturing, LLC, Gilbert, AZ (US)

( * ) Notice: Subject to any disclaimer, the term of this patent is extended or adjusted under 35 U.S.C. 154(b) by 476 days.

(21) Appl. No.: 12/941,999

(22) Filed: Nov. 8, 2010

(65) Prior Publication Data

US 2011/0225717 A1    Sep. 22, 2011

Related U.S. Application Data

(60) Provisional application No. 61/316,270, filed on Mar. 22, 2010.

(51) Int. Cl.
*E04H 4/16* (2006.01)
*B63B 59/00* (2006.01)
*F16K 31/48* (2006.01)

(52) U.S. Cl.
USPC ............ 137/119.07; 137/591; 137/624.11; 15/1.7

(58) Field of Classification Search
USPC ............ 137/119.07, 119, 591, 624.11; 15/1.7
See application file for complete search history.

(56) References Cited

U.S. PATENT DOCUMENTS

| | | | | |
|---|---|---|---|---|
| 4,077,424 | A * | 3/1978 | Ehret et al. | 137/119.07 |
| 4,817,656 | A * | 4/1989 | Gould | 137/2 |
| 6,325,087 | B1 * | 12/2001 | Tarr | 137/1 |
| 6,854,148 | B1 * | 2/2005 | Rief et al. | 15/1.7 |

* cited by examiner

*Primary Examiner* — Stephen M Hepperle
*Assistant Examiner* — Kevin Barss
(74) *Attorney, Agent, or Firm* — Parsons & Goltry; Michael W. Goltry; Robert A. Parsons

(57) ABSTRACT

Disclosed is a valve for use in in-floor pool cleaning systems. The valve has a housing with an inlet port, an internal cavity and multiple outlet ports. A drive source, which can be an impeller positioned in the cavity and in fluid communication with the inlet port, is directly or indirectly (such as by a gear assembly) connected to a fluid control plate that has one or more apertures. As fluid enters the cavity through the inlet port the drive rotates the fluid control plate. As the plate rotates the aperture(s) rotate to allow the fluid to pass through the aperture(s) and into the respective outlet ports.

40 Claims, 17 Drawing Sheets

VALVE FOR IN-FLOOR POOL CLEANING SYSTEM

PRIORITY CLAIM

This application claims priority to U.S. Provisional Application No. 61/316,270 entitled "In Floor Pool Cleaning System" and filed on Mar. 22, 2010, the disclosure of which that is not inconsistent with this specification is incorporated herein by reference. The disclosure of pending U.S. application Ser. No. 12/941,993, entitled "Head for In-Floor Pool Cleaning System," by Paul Gerald Malinasky, Jr. and filed on Nov. 8, 2010 is also incorporated herein by reference.

FIELD OF THE INVENTION

The present invention relates to a valve used with an in-floor pool cleaning system.

BACKGROUND OF THE INVENTION

In-floor pool cleaning systems have been developed that clean the inner surfaces of a pool by using pressurized water from cleaning heads mounted in the floor, sides and/or steps of the pool to move debris (which includes dirt, leaves and other material in the pool) into one or more drains where the debris can enter into a filtering system, and is generally pulled into a drain by vacuum. A pump, a distribution valve (or "valve") connected to the pump, and one or more cleaning heads connected to the distribution valve are included in a typical in-floor cleaning system. The pump delivers pressurized water into the distribution valve, which directs the pressurized water to successively control the operation of one or more cleaning heads at a time.

In a conventional distribution valve, fluid, such as water, enters a cavity of the valve through an inlet port and exits through outlet ports. In one such known design, each of the outlet ports is covered by a corresponding outlet valve that is opened or closed in response to the operation of an impeller positioned inside the cavity and connected to a gear reduction mechanism. As the impeller rotates, the gear reduction mechanism rotates to drive a cam system that sequentially opens and closes each individual outlet valve to open and close the corresponding outlet port.

A problem with this design is that it has individual outlet valves and a relatively large force must be applied by the gear reduction mechanism to turn the cam that opens and closes each individual outlet valve. Moreover, over time, as mineral deposits build up on the outlet valves and/or the cam surface, the valves become increasingly more difficult to open and close, thus requiring even more force to turn the cam. Further, the torque required from the gear reduction mechanism creates stress in each of the distribution valve components, and specifically in the gears themselves. This stress results in increased wear and tear, which shortens the life span of the components. Increased wear and tear also adds to the operational costs due to more frequent maintenance, repair, and replacement of parts, and leads to down time required to perform such tasks.

Other disadvantages of such conventional distribution valves are their size and the number of moving parts. First, the relatively large size of conventional valves requires more material to manufacture the valve, which leads to an increase in the overall cost. Second, for the known distribution valve previously described, it includes not only the moving parts of the gear reduction mechanism, but a separate outlet valve for each of the outlet ports, and these respective valves that must repeatedly open and close in order for water to move through the corresponding outlet port. The relatively large number of moving parts increases manufacturing costs, leads to more malfunctions, downtime and makes it more difficult to replace damaged components.

Another drawback of the conventional distribution valve described herein is restricted fluid flow and fluid leakage (or "blow-by"). When in the open position, the outlet valve over an outlet port still restricts the amount of fluid that flows through the associated outlet port. In addition, when closed, the outlet valve does not sufficiently seal the outlet ports that are not in use. Thus, the closed valves still permit some fluid to pass into the corresponding outlet ports, thus reducing the pressure of fluid exiting the open outlet port and decreasing the efficiency of the pool cleaning system. An increase in pump horsepower, and the power consumption of the pump, is required to maintain operational requirements. Conventional distribution valves thus often require larger pumps that demand more power than might otherwise be necessary if they operated more efficiently. Consequently, there is a need for an improved distribution valve.

SUMMARY OF THE INVENTION

Disclosed is a valve for use in in-floor pool cleaning systems. The valve has a housing with an inlet port, an internal cavity (or "cavity") and multiple outlet ports. A drive source is directly or indirectly (such as by a gear assembly) in mechanical communication with a fluid distribution plate (or "fluid circulation plate," or "plate") having one or more apertures. The drive source is preferably an impeller in fluid communication with the inlet port. As fluid enters the inlet port, the drive source directly or indirectly rotates the plate. As the plate rotates the aperture(s) in the plate move circumferentially to permit the fluid in the cavity to move through the aperture(s) and sequentially through each of the outlet ports. Each of the outlet ports is in communication with one or more cleaning heads in the pool. When pressurized water exits the cavity through the aperture in the plate and enters an outlet port, it travels through piping connected to the outlet port to cleaning head(s) associated with that outlet port. The cleaning head(s) then release pressurized water on or near the pool surface to move debris to one or more areas where the debris can be collected and filtered from the water. This is referred to herein as "activating" the cleaning heads.

In the preferred embodiment, an impeller is the drive source and is releasably coupled to a gear assembly within the cavity, and the gear assembly is mounted on and connected to the plate. The impeller, the gear assembly and the plate rotate around a shaft mounted to the interior floor of the housing and that extends upward into the cavity. As the impeller rotates, it indirectly drives the plate by imparting force to the gear assembly, which rotates the fluid distribution plate. As the plate rotates, the aperture(s) in the plate moves sequentially over the outlets thus permitting water to move through at least one outlet at a time and activate the cleaning heads associated with the outlet(s), as described above.

The distribution valve of the present invention provides advantages over conventional devices. For example, because the aperture(s) in the plate rotates over each of the outlet ports it eliminates the need for each of the outlet ports to have its own individual valve cover to control fluid flow. This reduces or eliminates the problems associated with the valve covers, and permits fluid to flow essentially uninterrupted from the cavity through the aperture and through an outlet port, so debris is less likely to clog the valve. Moreover, because the present invention allows for improved fluid flow it requires a pump with less power than the previously-described conventional valve to operate the same number of cleaning heads.

Aspects of the present invention will be apparent from the following detailed description of the particular embodiments of the invention, and the accompanying drawings.

DETAILED DESCRIPTION OF PREFERRED EMBODIMENTS

Turning now to the Figures, where the purpose is to describe a preferred embodiment of the invention and not to limit same, FIGS. 1-5 show a valve 10 according to aspects of the invention. The purpose of valve 10 is to receive pressurized water from a pump and direct the pressurized water sequentially to one or more outlets in the valve wherein each outlet directs water to a group (i.e., one or more) of cleaning heads associated with the particular outlet and used in an in-floor cleaning system.

Figure 7:
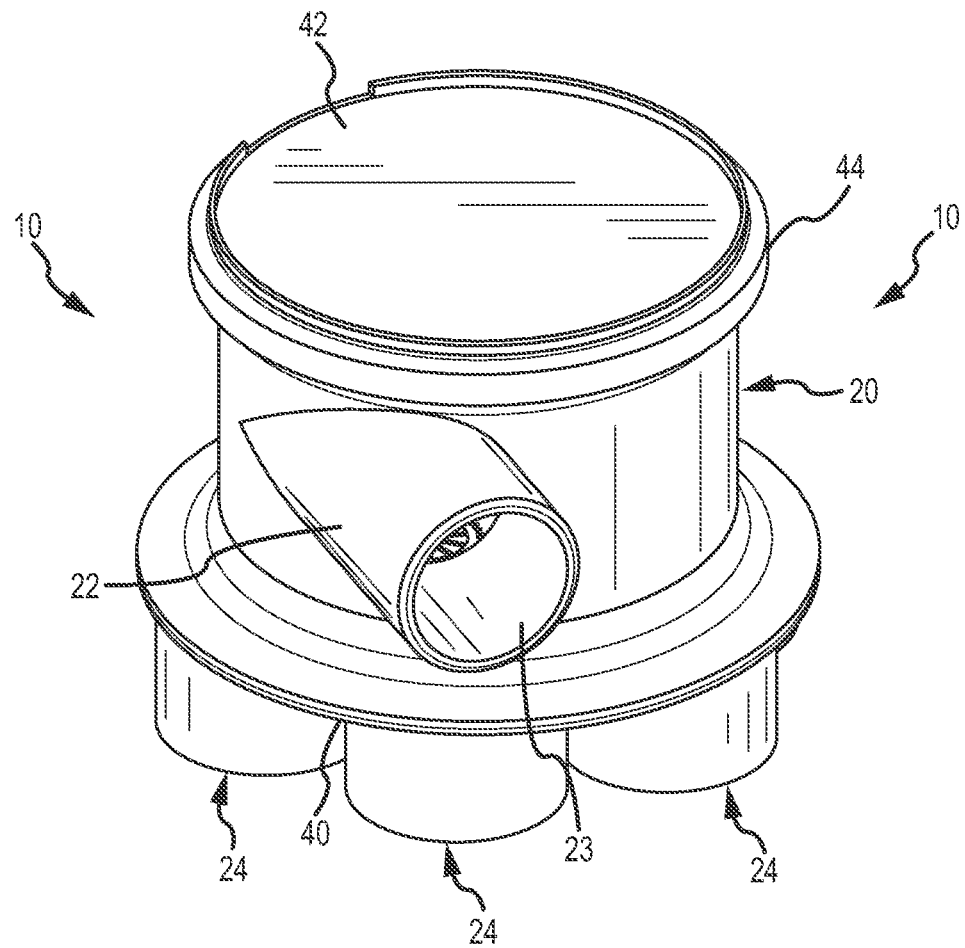
FIG. 7 is a perspective view of the valve of FIG. 1.

The preferred valve 10 has a housing 20, which includes a stem 22, an inlet port 23, a plurality of outlet ports 24, an internal cavity (or cavity) 30, and a base 40. The distribution valve 10 further comprises a lid 42 and a fastener 44, which can be any suitable structure that removably couples the lid 42 to the housing 20, and is preferably a metal band clamp, the structure of which is known to those skilled in the art. In the figures, such as FIG. 7, the bolt and nut used with clamp fastener 44 to loosen or tighten it are not shown.

The distribution valve 10 further comprises a drive source 50, which in this embodiment is an impeller 50A (shown, for example, in FIGS. 5 and 13-16), openings 70 to the outlet ports 24 (shown, for example, in FIG. 6), a gear assembly 100 (shown, for example, in FIGS. 5, 11-15 and 17), and a fluid distribution plate 200 (shown, for example, in FIGS. 5, 8, 10-15 and 17).

Housing 20 has an upper lip 20A that has a groove 20B (best seen in FIG. 6) configured to receive a lip 42A of lid 42 (shown in FIG. 9) in order to seat lid 42 properly on housing 20. To further enhance the seal between the upper lip 20A and lip 42A, an O-ring (not shown), may be placed in groove 20B to engage lip 42A. When fastener 44 is engaged, the lid 42 is preferably pressed against the O-ring and the top portion of the housing 20, so that, essentially none of the fluid that enters the valve 10 escapes through a gap between cover 42 and housing 20. Housing 20 is preferably comprised of a plastic, such as polypherylene oxide (PPO) with 20% barium sulfate fibers by weight, or polycarbonate with about 30% fiberglass filler, but can be made of any suitable material, including metal. The lid 42 may be constructed of any suitable material, particularly a suitable plastic, and polycarbonate is preferred.

Figure 9:
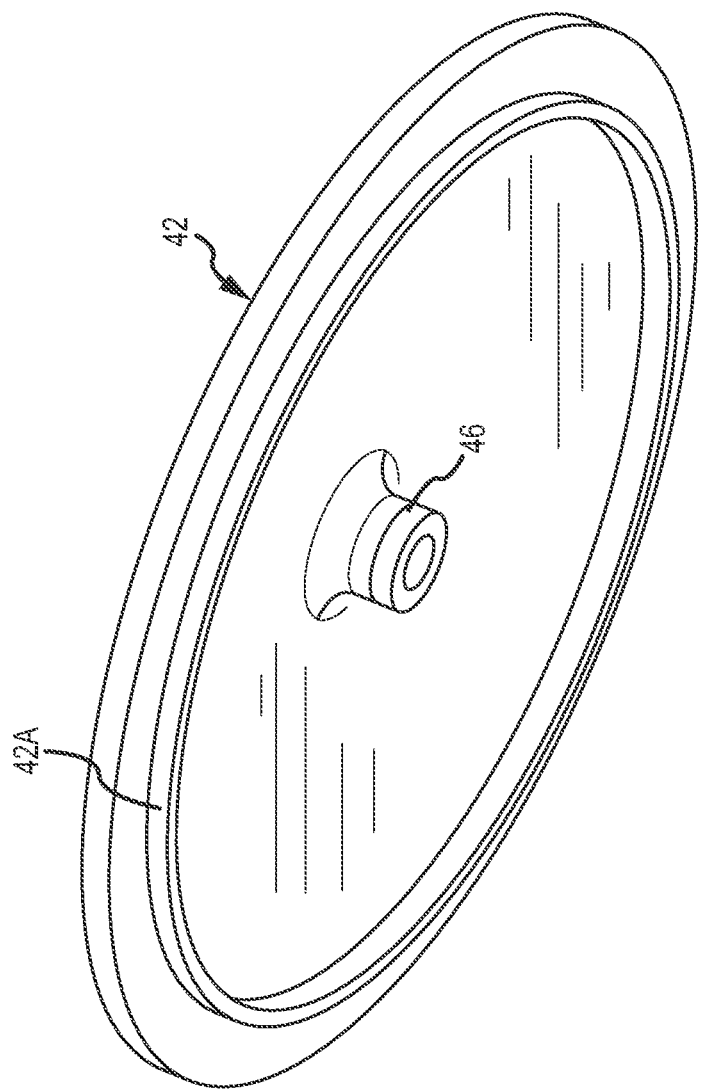
FIG. 9 is a bottom perspective view of a lid according to the invention.
Figure 10:
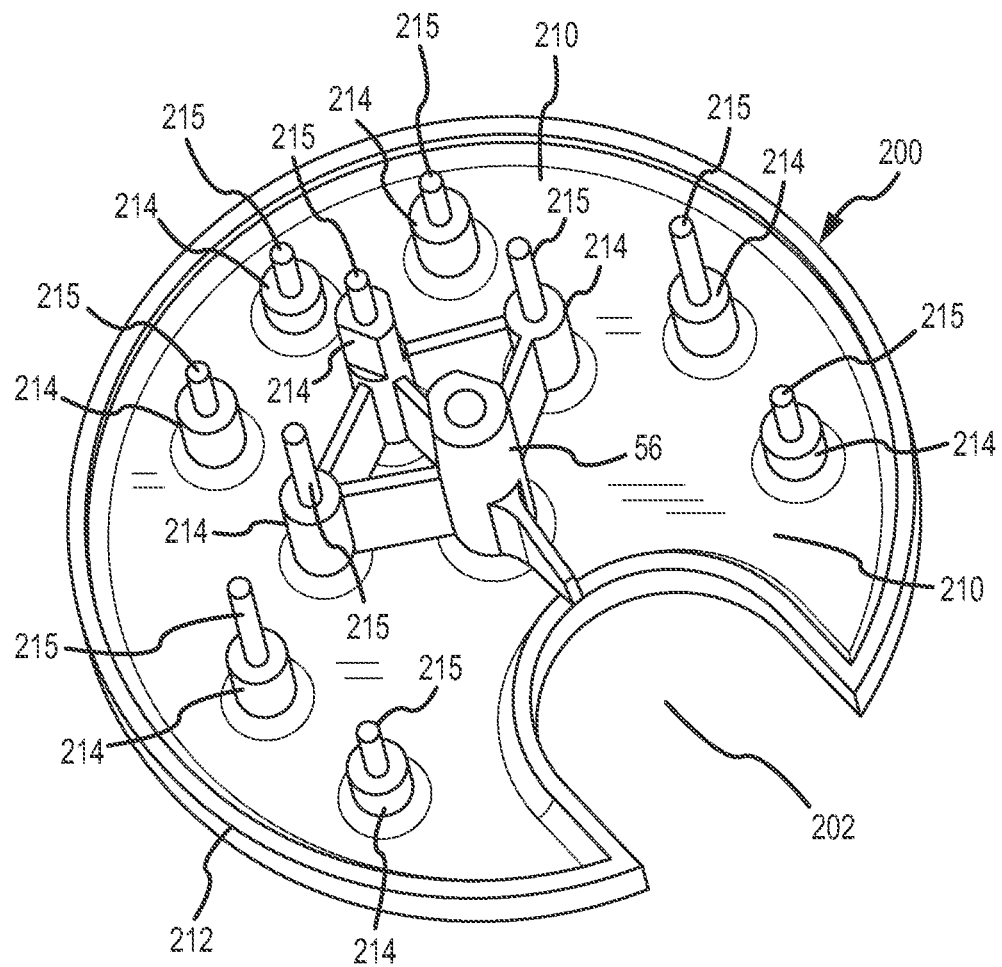
FIG. 10 is a top view of a fluid control plate according to the invention.
Figure 11:
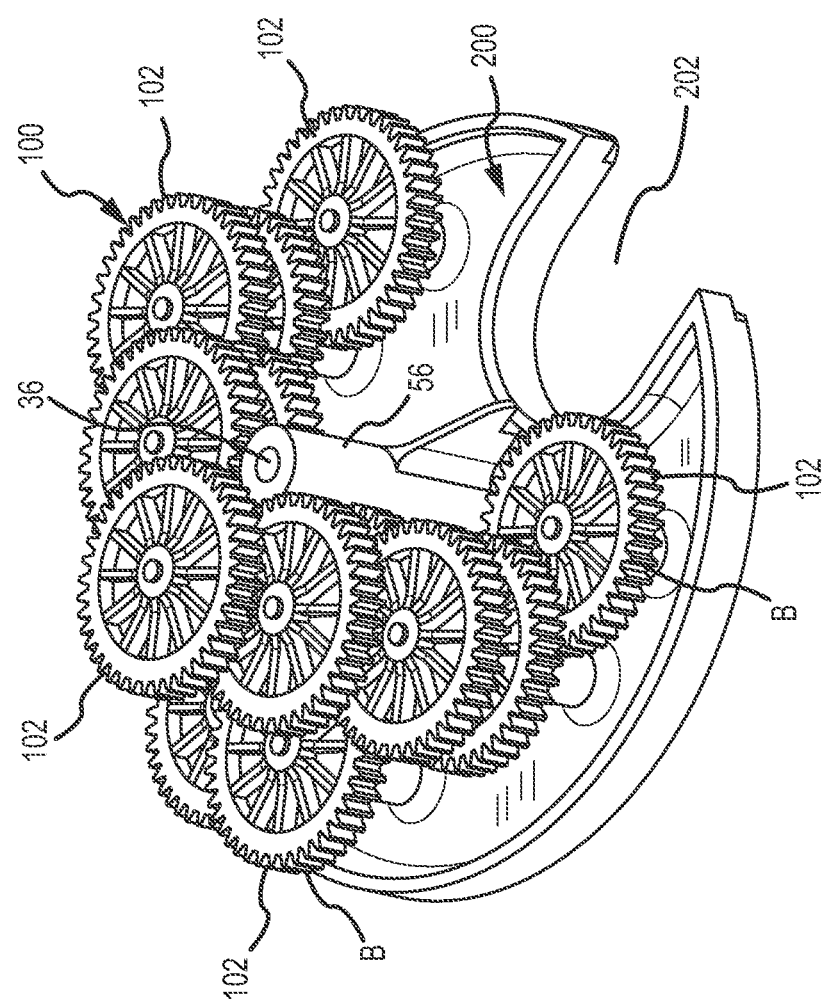
FIG. 11 is a top perspective view of the fluid control plate of FIG. 10 with the gear assembly attached.
Figure 12:
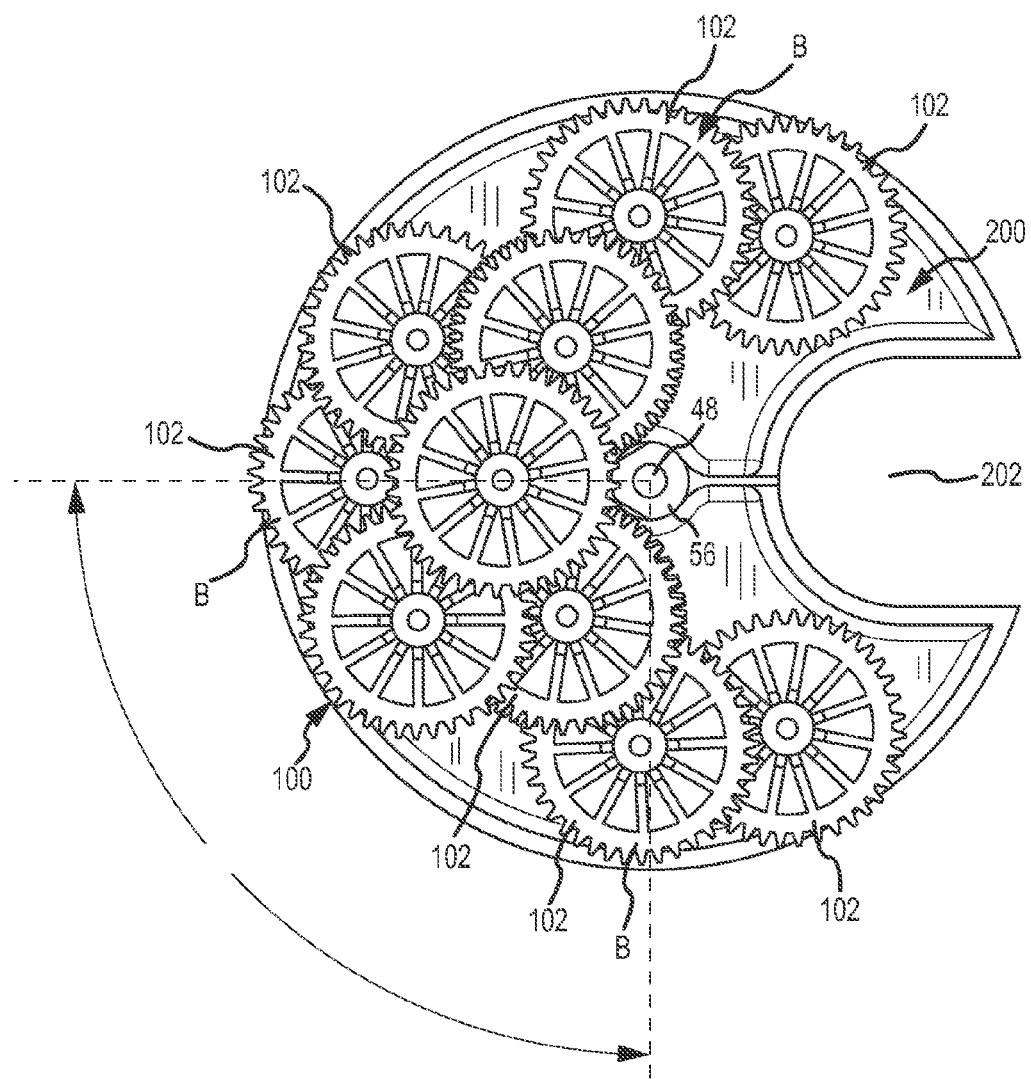
FIG. 12 is a top view of the fluid control plate of FIG. 11.
Figure 13:
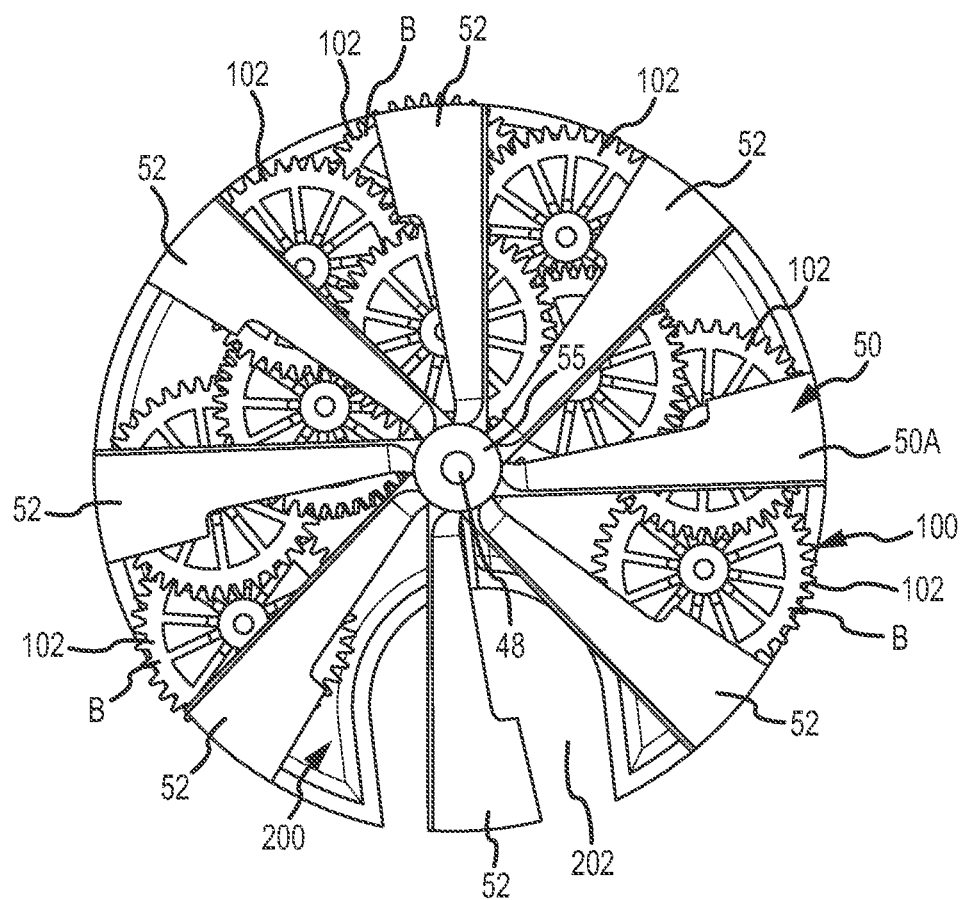
FIG. 13 is a top view of the fluid control plate with gear assembly attached of FIGS. 11 and 12 and that also shows an impeller.
Figure 14:
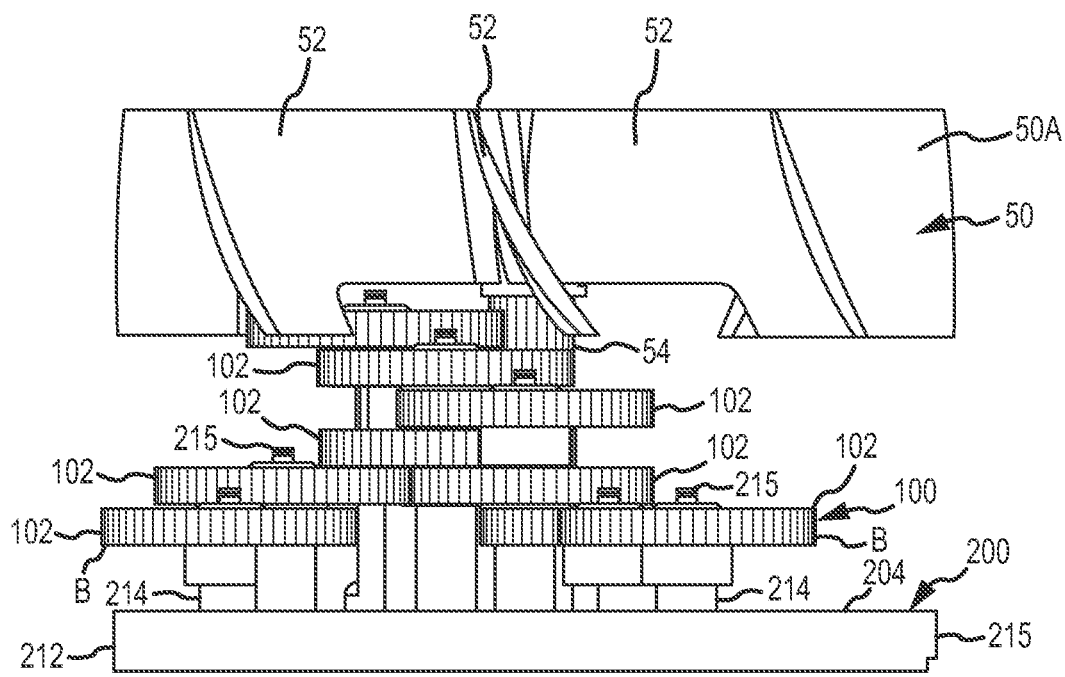
FIG. 14 is a side view of the structure shown in FIG. 13.
Figure 15:
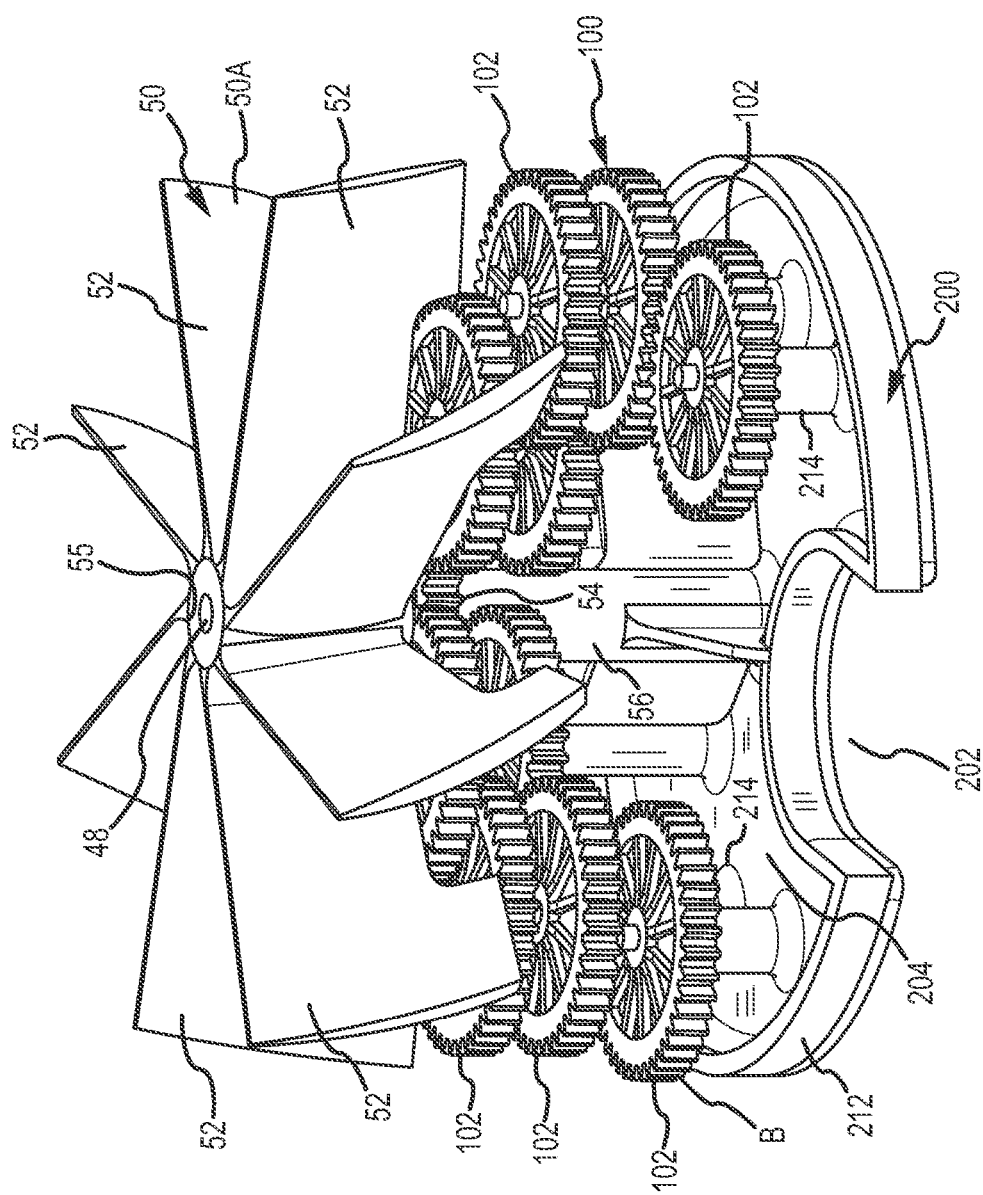
FIG. 15 is a side perspective view of the structure shown in FIGS. 13 and 14.
Figure 16:
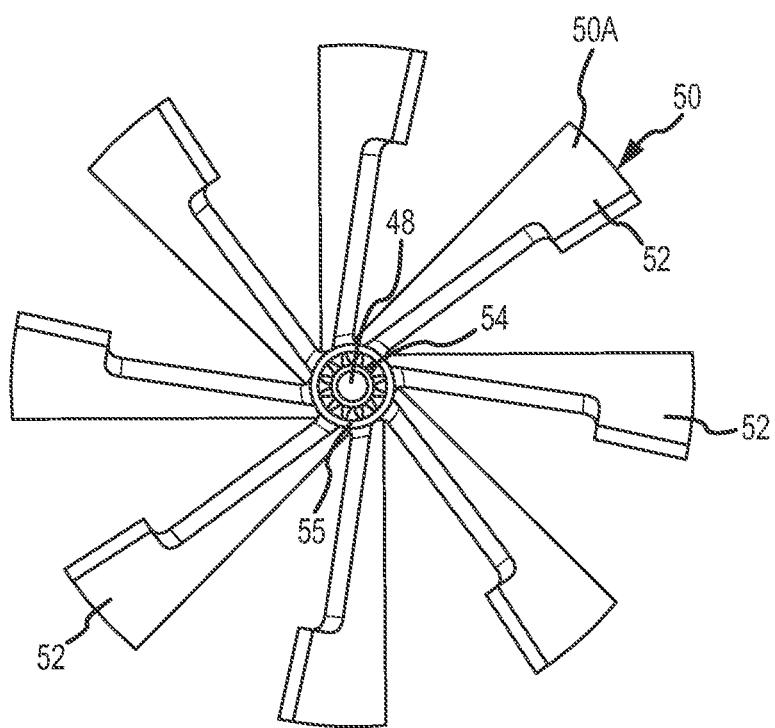
FIG. 16 is a top view of an impeller according to the invention.

As shown in FIG. 9, the underside portion of the cover 42 also includes a receiving portion 46 that is configured to receive a shaft 48 mounted in an interior floor 60 (shown, for example, in FIG. 6) of housing 20 and extends through a casting 56 (shown in FIGS. 10-12). Shaft 48 extends upwards into cavity 30 and impeller 50A and plate 200 are mounted on the shaft 48.

Figure 1:
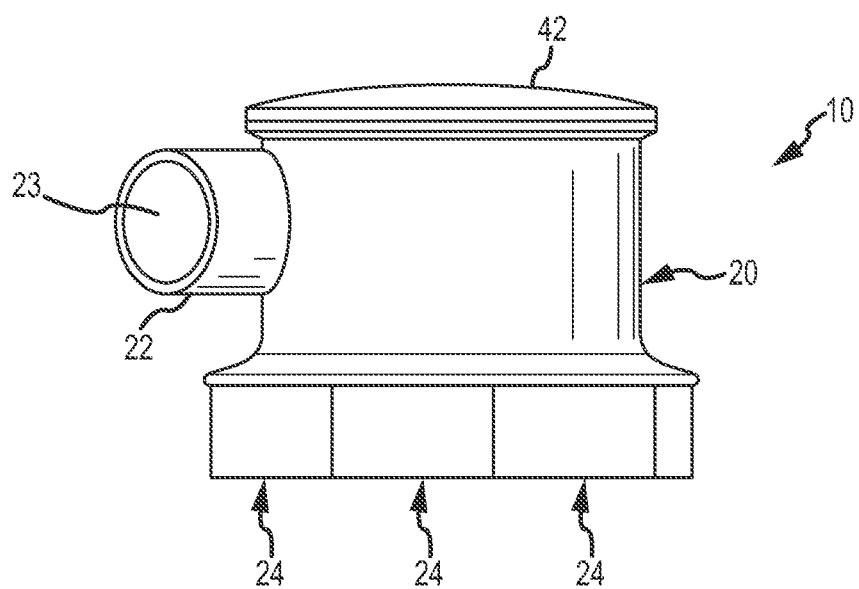
FIG. 1 is a side view of an assembled valve according to an aspect of the invention.
Figure 2:
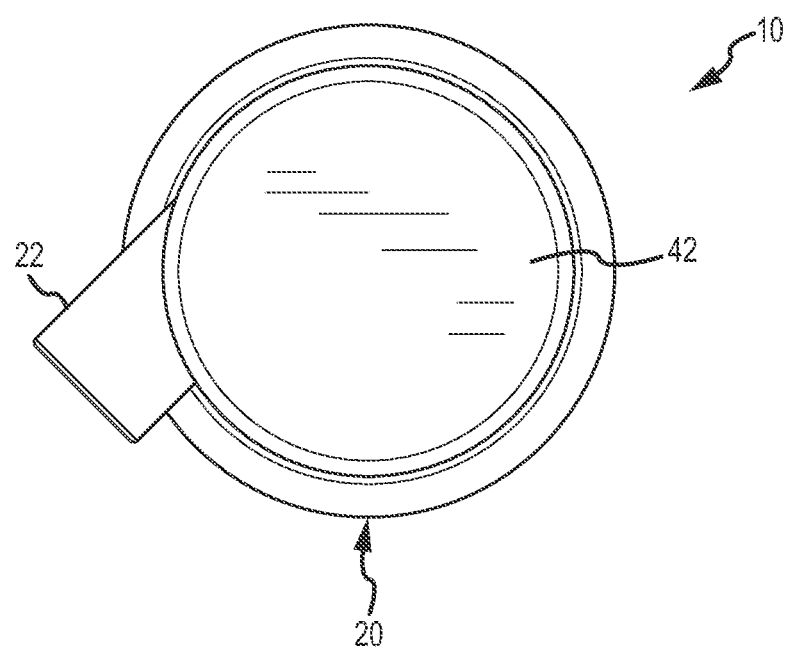
FIG. 2 is a top view of the assembled valve of FIG. 1.
Figure 3:
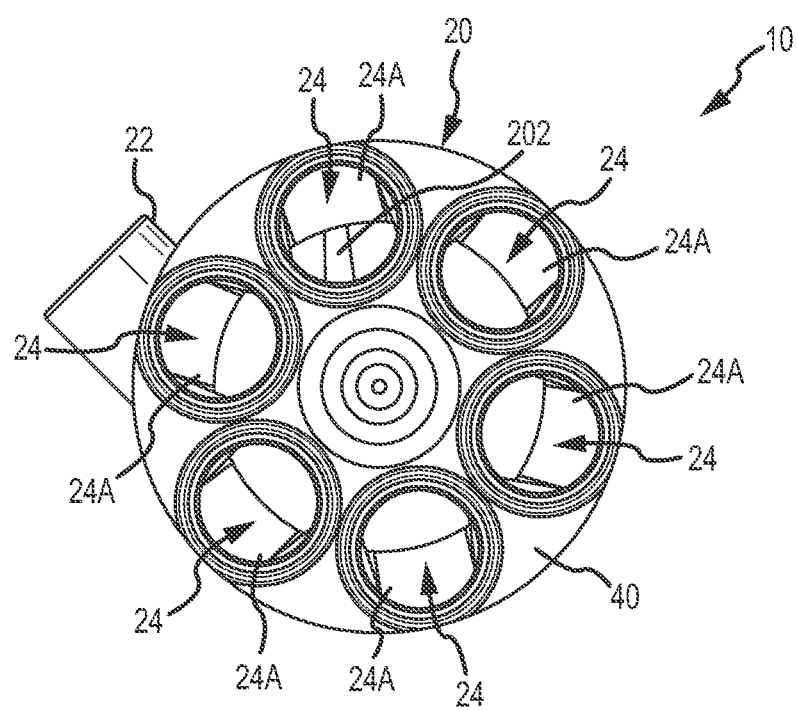
FIG. 3 is a bottom view of the assembled valve of FIG. 1.
Figure 4:
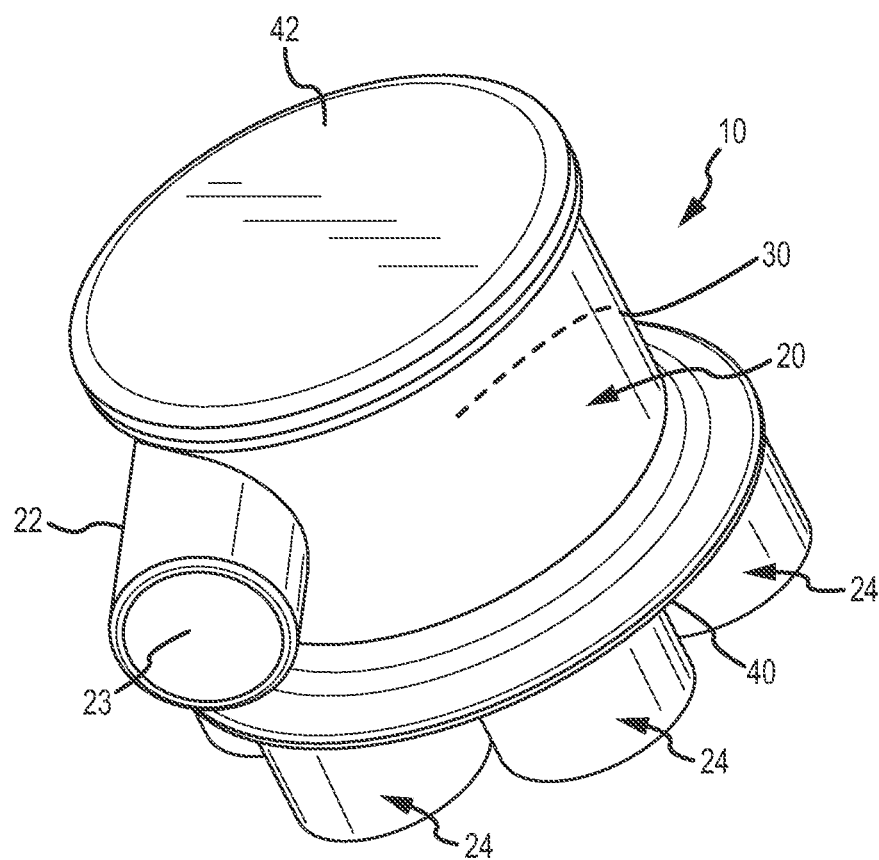
FIG. 4 is a perspective view of the housing of the valve of FIG. 1 showing the internal cavity.
Figure 5:
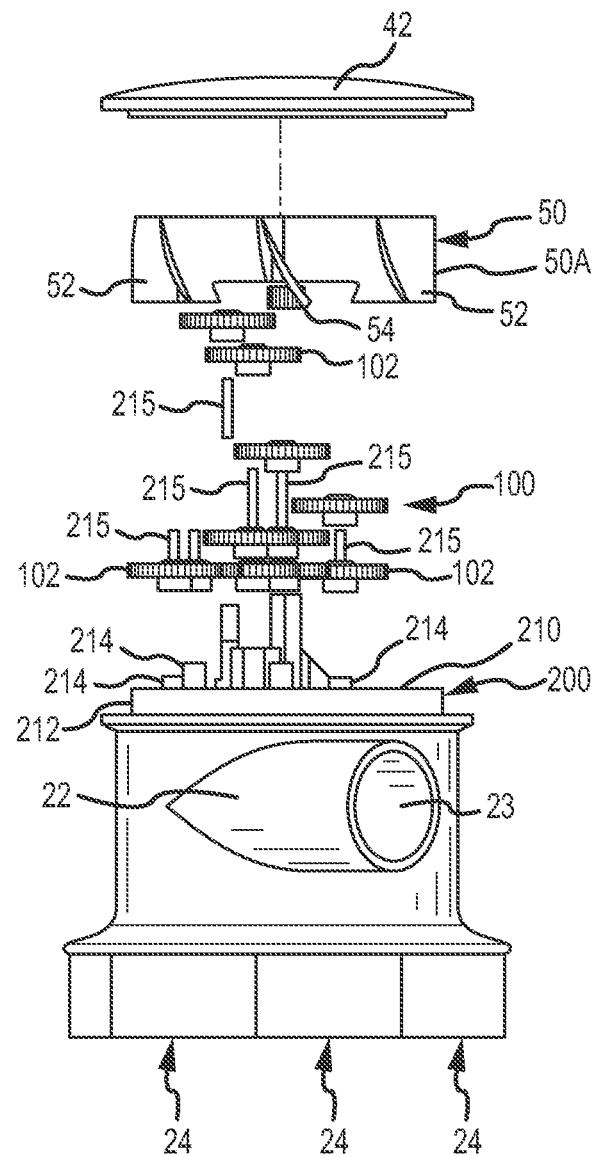
FIG. 5 is an exploded view of the valve of FIG. 1 that does not include the shaft upon which the impeller and plate are mounted.

As shown, for example, in FIGS. 1 and 4, the inlet port 23 is preferably formed in stem 22 of the housing 20 and the plurality of outlet ports 24 are preferably positioned in and extend from base 40 of the housing 20. The inlet port 23 is formed tangential to cavity 30 in this preferred embodiment rather than being formed to direct pressurized fluid to the center of cavity 30, so that pressurized water can enter into the side of cavity 30 where it pushes blades 52 of impeller 50A, which helps to add rotational force to impeller 50A, if impeller 50A is selected as the drive source. The purpose of valve 10 is to allow pressurized water from a pump (not shown) to enter the internal cavity 30 through a pipe (not shown) connected to inlet port 23, flow through the cavity 30, and exit the cavity 30 through one or more of the outlet ports 24. In a preferred embodiment, the cavity 30 is preferably about 5¾"-6⅜", and most preferably about 6.02" in diameter, and about 3⅜"-3¾" deep as measured to the interior floor 60.

Figure 6:
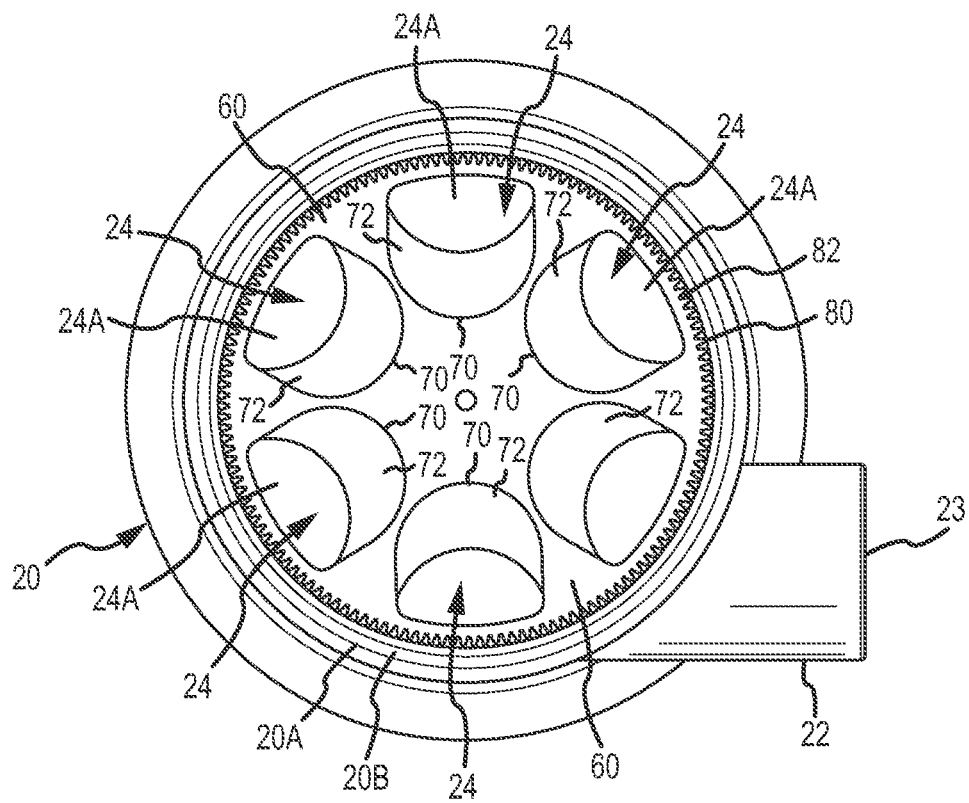
FIG. 6 is a top view of the housing of the valve of FIG. 1 with the lid and internal components removed.
Figure 8:
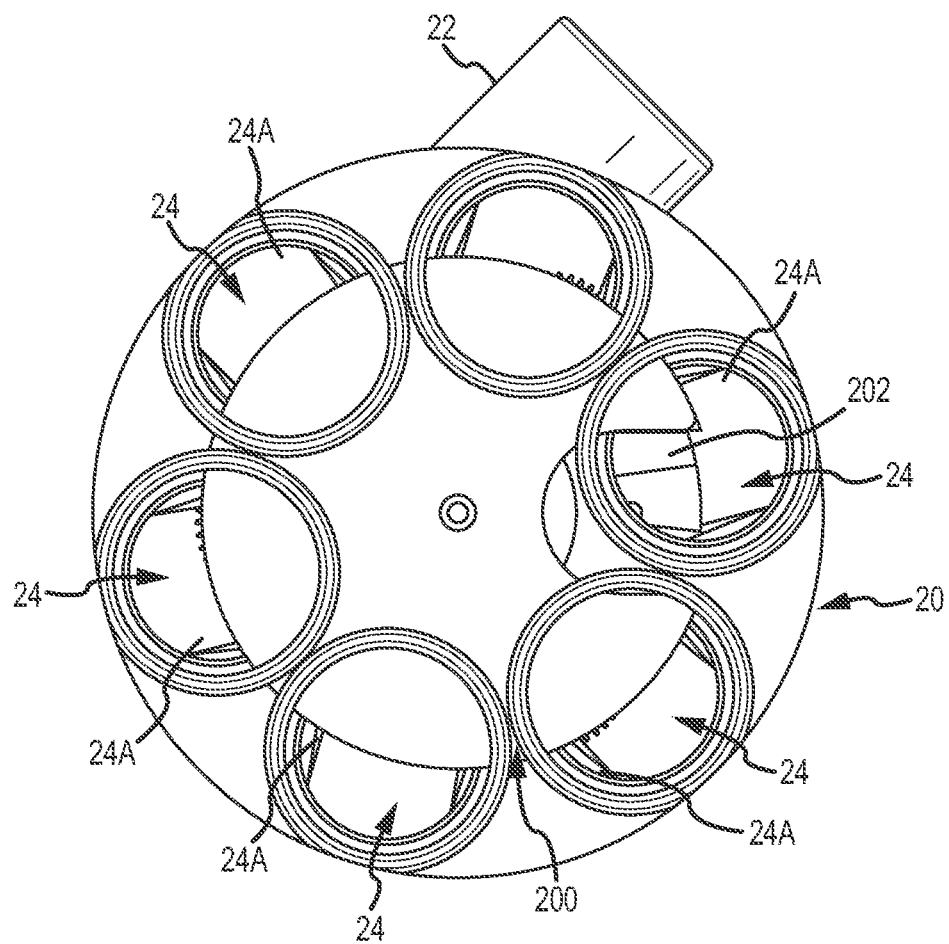
FIG. 8 is a partial, bottom view of the valve of FIG. 1 with structures removed to show the plate and outlet ports.

As shown in FIG. 6, the interior floor 60 includes a plurality of openings 70. Each of the preferred openings 70 is substantially circular and is the opening to an output port 24. Each output port 24 has an exit opening 24A (best seen in FIGS. 6 and 8) that preferably has an internal diameter of about 2", which is similar in size to the diameter of Schedule 40 piping, and with which those of ordinary skill in the art are familiar. Outlet ports 24 could, however, be of any suitable size or shape. Each of the output ports 24 also has an outwardly sloped inner surface 72, which is best seen in FIG. 6, and as shown the exit openings 24A are larger than openings 70, so the outlet progressively opens wider moving from floor 60 to the bottom of base 40. The advantage of the angled output port and relatively smaller openings 70 is that the fluid control plate 200 can be smaller than the cavity 30 and still cover and block the openings 70 (as best shown in FIG. 8) except for the one or more openings 70 over which the aperture 202 is positioned. This allows for a smaller valve and saves material.

Figure 17:
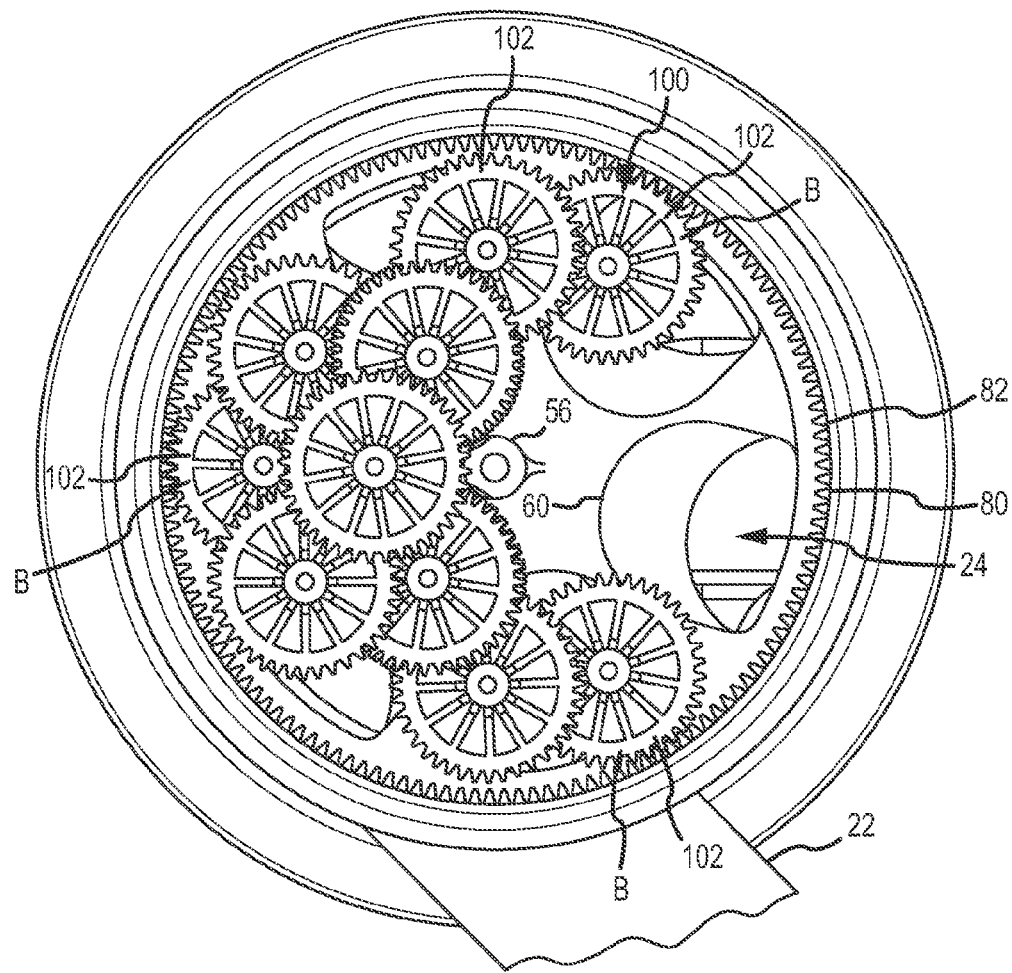
FIG. 17 is a top view of the valve of FIG. 1 with the lid, impeller and other components not shown, and that shows the gear assembly mounted on the fluid control plate and positioned inside the housing.

As shown in FIGS. 6 and 17, the preferred housing 20 has an interior wall 80 into which gear teeth 82 are formed or attached. The purpose of gear teeth 82 is to mechanically engage the gear assembly 100 in order to rotate the plate 200. In a preferred embodiment there are one hundred forty-one teeth 82.

As shown in FIGS. 5 and 13-16, the preferred drive source 50 is an impeller 50A that includes blades (or vanes) 52, a gear 54 and a hub 55. Drive source 50 could instead be a motor or any structure suitable for rotating plate 200. Impeller 50A is positioned within the cavity 30 of housing 20. The purpose of impeller 50A and gear assembly 100 is to direct force from the pressurized water entering cavity 30 from inlet port 23 to move plate 200, as described further below. The impeller 50A is substantially circular and rotates about the shaft 36 in response to fluid flow through the inlet port 23. This imparts rotational force through gear 54 to gear assembly 100, which ultimately causes plate 200 to rotate. The gear 54 (which preferably has twelve teeth and a maximum diameter of about 0.5"-0.625", and most preferably about 0.583") releasably couples to (i.e., is in mechanical communication with) the gear assembly 100. Impeller 50A is preferably comprised of plastic, and most preferably of polyoxymethylene ("POM") with or without 10% fiberglass by weight, although any suitable material could be used. The impeller 50A is preferably about 5¾" in diameter if the cavity is 6" in diameter.

In the preferred embodiment, the impeller 50A has eight blades 52, each of which preferably has the same structure, and which are equally radially spaced about the center (or hub) 55 of impeller 50. Each blade 52 has a thickness wherein the thickness is smaller at the top of the vane than at the center or bottom of the vane. The preferred impeller 50A has a diameter of at least 80% the diameter of the cavity and preferably between about 85%-98%, or about 90%-96%, and most preferably about 95.5%, of the diameter of the cavity. If the cavity has a diameter of about 6.02" the impeller has a diameter of about 5.75".

A gear assembly 100 is utilized in the preferred embodiment and is also positioned within the cavity 30 of housing 20. As shown in FIGS. 5, 10-15 and 17, the gear assembly 100 is mounted (or positioned) on the distribution valve plate 200. The purpose of gear assembly 100 is to transfer force from the rotation of the drive source 50 to plate 200, while at the same time causing plate 200 to move at a sufficient speed to permit pressurized water to enter each of the outlets 24 for a sufficient time to properly clean a pool. Because the gear teeth 82 on interior wall 80 (FIGS. 6 and 17) are stationary with respect to the housing 20 and do not rotate, the plate 200 to which gear assembly 100 is connected rotates in response to the force of the gear assembly 100 mechanically communicating with gear teeth 82.

Gear assembly 100 includes fourteen separate gears 102 in this preferred embodiment and each gear has the same number of teeth (each preferably has forty teeth and the same diameter (preferably about 1½"-2" and most preferably about 1¾"). This creates ease of manufacturing since only one gear is utilized. The gear assembly 100, however, may include any suitable number of gears of any suitable size and with any suitable number of teeth that provide an appropriate gear reduction ratio, so that when the gear assembly 100 receives rotational force from the drive source 50 (which is preferably impeller 50A) the gear assembly 100 reduces the rotational speed of the drive source to provide the plate 200 with a suitable rotational speed. In this preferred embodiment, there are three "bottom" gears 102 (which are further identified in the Figures by the letter B), which are the gears that engage gear teeth 82 on inner wall 80 of housing 20. Each of these bottom gears is preferably circumferentially spaced at about 90° from one of the other bottom gears as measured around the circumference the fluid distribution plate 200. The about 90° spacing is measured based on straight lines passing outward from center post 56 (which retains shaft 48) and approximately through the center of the bottom gears, as shown in FIG. 12. However, any suitable spacing or number of bottom gears may be used.

Gear assembly 100 is positioned on (or mounted on) fluid control plate 200, so that the entire assembly 100 and plate 200 can be removed as one piece, and then repaired, or a complete new piece consisting of a gear assembly 100 and a plate 200 can be inserted into housing 200.

Plate 200 includes a top surface 210 and outer edge 212. As best seen in FIG. 10, castings 214 are formed in top surface 210 and each casting 214 retains a post 215, which is preferably formed of metal, such as steel. The gears 102 are positioned on posts 215. The position and height of respective castings 214 and posts 215 depends upon the size and number of gears used and the gear reduction sought and can be determined by one skilled in the art given the operating parameters of the gear assembly, and number and relative size of the gears. The preferred embodiment of this invention is designed so that fluid control plate 200 makes about one complete revolution for every 2,700-3,200, and most preferably, about every 2,991.6 revolutions of the impeller 50A. Further, if impeller 50A is the drive source, each bottom gear makes about one revolution for every 800-900, and most preferably, about every 848.6 revolutions of the impeller 50A. The gears 102 are preferably formed of plastic and most preferably of POM 100 P, although any suitable material can be used.

As shown in FIGS. 10 and 11, the fluid distribution plate 200 is substantially circular and has a thickness in the axial direction. The thickness of the plate 200 is determined by the material used to manufacture the plate 200, as the plate 200 should be sufficiently strong to resist significant deflection in the axial direction, and persons skilled in the art understand how to select the appropriate material and thickness. The plate 200 is preferably comprised of a relatively low-friction plastic such as POM 500 P. The circumference of plate 200 in this embodiment is slightly smaller than the circumference of the interior wall 80. For example, in a preferred embodiment, the plate 200 is about ⅛"-¼" less in diameter than the diameter as measured across teeth 82, has a diameter of about 85%-98%, or about 90%-96% and most preferably about 95.5% of the diameter of the cavity. If the cavity has a diameter of 6.02" the plate preferably has a diameter of about 5.75".

The smaller diameter allows the plate 200 to freely rotate within the cavity 30, but yet substantially restrict the flow of fluid between the outer edge of plate 200 and the interior wall 80. The fluid distribution plate 200 has a top surface 210 and a bottom surface. The plate 200 includes an aperture 202 formed in the plate 200 and a casting 56 formed on a top surface thereof, through which the shaft 48 passes.

The flow of fluid through each of the outlet ports 24 is controlled by the position of the plate 200 and aperture 202 in relation to each of the openings 70. Although the aperture 202 may be formed in the edge of plate 202, the aperture 202 may also be formed entirely within the plate 200, or at any suitable location on the plate 200 to permit fluid to pass through it and into the respective outlet opening(s) 70 as plate 200 rotates. The aperture 202 as shown is generally U-shaped, but may be of any suitable shape that allows fluid to flow therethrough. The upper edge of the aperture 202 may be beveled, or otherwise rounded, to allow fluid flow around the edge. The aperture 202 is preferably slightly larger than any of the plurality of openings 70 in order to permit maximum fluid flow into each opening 70 and hence through each outlet 24.

Preferably, the bottom surface of the plate 200 is smooth and is in contact with interior floor 60, such that fluid leakage (also called "blow-by") into the openings 70 over which aperture 202 is not positioned is significantly reduced. As pressurized water enters the cavity 30 it helps to press plate 200 against floor 60 to assist in preventing leakage into the openings 70 over which aperture 202 is not positioned.

As the plate 200 rotates (in response to the rotation of the gear assembly 100 in this embodiment), the aperture 202 in the plate 200 moves over each of the openings 70 in the interior floor 60. As a result, fluid flowing into the housing 20 through the inlet port 23 ultimately passes through the aperture 202 and through the opening(s) 70 and outlet port(s) 24 over which the aperture 202 is then positioned. Because the plate 200 is in contact with the floor 60 and because of the pressure of water on the top of plate 200, most, if not all, of the fluid leakage into openings 70 and outlet ports 24 over which the aperture 202 is not positioned is prevented.

Although in this preferred embodiment the plate 200 has a single aperture 202, it could have more than one aperture(s) positioned at any suitable location on the plate 200 so as to release water into more than one outlet 24 at a time.

Test results on the present invention indicate that only 6-7% of the water that exits a distribution valve according to the invention exits through openings 70 and outlet ports 24 over which the aperture 202 is not positioned. In comparison, test results of another conventional distribution valve indicate that as much as 40-45% of the fluid entering the valve leaks through outlet ports that are supposed to be closed.

In an embodiment of the invention, the valve can function properly with as little as 10-15 gal/min. of water entering inlet 23 through a 2" pipe or as much as 115-120 gal/min. of water entering inlet 23 through a 2" pipe. Depending upon the flow rate into the valve and the type of cleaning heads associated with each outlet, one outlet can typically operate 5-6 cleaning heads efficiently.

Another advantage of the present invention is that, in a preferred embodiment, the aperture 202 is always positioned at least partially over an opening 70, so if the filtering system utilizing the valve were to shut off, or if the valve were to fail, water would exit the cavity 30 through an opening 70 and the pressure inside the cavity 30 would be released. With known devices having valve covers for each valve, all of the valves could remain closed in such a situation, the valve would remain pressurized, and that could lead to a hazardous situation.

Having thus described embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired result.

What is claimed is:

1. A valve for use in an in-floor pool cleaning system, the valve comprises a housing, having an internal cavity, an inlet port, and a plurality of outlet ports, an interior floor that includes a plurality of openings, and each of the plurality of openings is to one of the plurality of outlet ports; a drive source and a fluid control plate inside the cavity; the drive source is an impeller and a gear and is in fluid communication with the inlet port, whereby fluid that enters the inlet port rotates the drive source; the fluid control plate includes an aperture and a gear assembly mounted to the fluid control plate; the gear of the impeller of the drive source is coupled to the gear assembly of the fluid control plate whereby rotation of the drive source urges rotation of the fluid control plate so as to move the aperture sequentially over each of the outlet ports to permit fluid to enter the outlet port over which the aperture is positioned; the fluid control plate has a bottom surface that is in contact with the interior floor to assist in preventing leakage into each of the plurality of openings over which the aperture of the fluid control plate is not positioned; the housing has an interior wall and a gear surface on the interior wall; and the gear surface is in mechanical communication with the gear assembly.

2. The valve of claim 1 wherein there are six outlet ports and six openings.

3. The valve of claim 1 wherein the fluid control plate has a single aperture.

4. The valve of claim 1 wherein the gear assembly comprises a plurality of gears, and there are a plurality of posts connected directly to and extending upwards from the fluid control plate through which the aperture is formed, and the gears of the plurality of gears are mounted on the posts.

5. The valve of claim 4 wherein the plurality of gears comprises fourteen gears.

6. The valve of claim 4 wherein each of the gears of the plurality of gears has a number of teeth, and the number of teeth of each of the gears of the plurality of gears is the same.

7. The valve of claim 1 wherein the inlet port is configured to receive a pipe having a 2" I.D.

8. The valve of claim 1 wherein each outlet port is configured to receive a pipe having a 2" I.D.

9. The valve of claim 1 wherein the housing further includes a removable lid.

10. The valve of claim 1 wherein a shaft is connected to the interior floor, the shaft extending upwards into the cavity, and the fluid control plate, gear assembly and impeller are mounted for rotation about the shaft.

11. The valve of claim 1 wherein the housing is plastic.

12. The valve of claim 1 wherein the housing, impeller, gears and plate are each comprised of plastic.

13. The valve of claim 1 wherein the impeller has spaced-apart vanes extending from a hub.

14. The valve of claim 13 wherein each vane has a downward angle of between 5° and 20° as shown in a side view.

15. The valve of claim 13 wherein the impeller has eight vanes.

16. The valve of claim 13 wherein the inlet port is tangential to the impeller vanes.

17. The valve of claim 1 wherein the gear assembly has three bottom gears in mechanical communication with the gear surface.

18. The valve of claim 17 wherein the fluid control plate has a circumference and each of the three bottom gears that is in mechanical communication with the interior wall is spaced 90° from at least one other bottom gear, as measured about the circumference of the fluid control plate.

19. The valve of claim 1 that includes one or more bottom gears and the fluid control plate makes one complete rotation for every 3-4 complete rotations of the one or more bottom gears.

20. The valve of claim 1 wherein the plate makes one complete revolution for every 3 1/2 revolutions of the one or more bottom gears.

21. The valve of claim 1 wherein the gear assembly includes one or more bottom gears, wherein each of the bottom gears makes between 0.5 and 1.5 revolutions for every 2500 revolutions of the impeller.

22. The valve of claim 1 wherein the gear assembly includes one or more bottom gears wherein each of the bottom gears makes one revolution for every 2500 revolutions of the impeller.

23. The valve of claim 1 wherein each of the outlet ports are formed at an outwardly-extending angle.

24. A pool cleaning system comprising a pump, the valve of claim 1 and one or more cleaning heads.

25. The pool cleaning system of claim 24 wherein each of the plurality of outlet ports is in fluid communication with at least one cleaning head, the cleaning head not being in fluid communication with any of the other outlet ports.

26. The pool cleaning system of claim 24 wherein the pump is in fluid communication with the inlet port of the valve.

27. The valve of claim 1 wherein there is no structure between the aperture and the outlet port when the aperture is positioned over the outlet port.

28. The valve of claim 1 wherein the impeller has a diameter, and the cavity has a diameter, and the diameter of the impeller is 85%-98% the diameter of the cavity.

29. The valve of claim 1 wherein the impeller has a diameter and the cavity has a diameter and the diameter of the impeller is 90%-96% of the diameter of the cavity.

30. The valve of claim 1 wherein the fluid control plate has a diameter, and the cavity has a diameter, and the diameter of the fluid control plate is 90%-96% the diameter of the cavity.

31. The valve of claim 1 wherein the fluid control plate has a diameter, and the cavity has a diameter, and the diameter of the fluid control plate is 85%-98% the diameter of the cavity.

32. A mechanism for use in a valve, the mechanism comprising a floor that includes a plurality of openings; a gear assembly having a plurality of gears, the gear assembly is mounted on a fluid control plate the fluid control plate has an aperture for permitting water to pass through, a drive source includes an impeller and a gear; the gear of the impeller of the drive source is coupled to the gear assembly of the fluid control plate, whereby rotation of the drive source about the shaft urges rotation of the fluid control plate; the fluid control plate has a bottom surface that is in contact with the floor to assist in preventing leakage into each of the plurality of openings over which the aperture of the fluid control plate is not positioned; and the mechanism is configured to fit into a housing having an interior wall with teeth on the interior wall, wherein at least one of the gears of the plurality of gears is positioned so as to mechanically engage the teeth on the interior wall.

33. The mechanism of claim 32 wherein each gear is approximately the same diameter and has the same number of teeth.

34. The mechanism of claim 32 wherein there are a plurality of posts connected to and extending upwards from the fluid control plate, the gears being mounted on the posts.

35. The mechanism of claim 32 that includes fourteen gears.

36. The mechanism of claim 32 that further includes one or more bottom gears of the plurality of gears and each of the bottom gears makes one complete rotation for every 800-900 complete rotations of the impeller.

37. The mechanism of claim 32 wherein the fluid control plate makes one complete revolution for every 2,700-3,200 revolutions of the impeller.

38. The mechanism of claim 32 that further includes one or more bottom gears of the plurality of gears, wherein each of the bottom gears makes between one revolutions for every 848.6 revolutions of the impeller.

39. The mechanism of claim 32 wherein the fluid control plate makes one complete revolution for every 2,991.6 revolutions of the impeller.

40. A housing for a valve, the housing having an internal cavity, a lid to access the internal cavity and an inlet to the internal cavity, the inlet being tangential to the internal cavity, and a floor including outlet ports, the outlet ports each extend from an opening in the floor to an exit opening, the exit openings are each larger than the openings in the floor and the outlet ports each progressively opens wider from the corresponding opening in the floor to the corresponding exit opening, and the outlet ports extend radially outward each at an outwardly-extending angle.

* * * * *